(12) United States Patent
Liu et al.

(10) Patent No.: US 10,092,911 B2
(45) Date of Patent: Oct. 9, 2018

(54) CENTRIFUGE FILTER TUBE

(71) Applicant: Yuemeng Liu, Beijing (CN)

(72) Inventors: Yuemeng Liu, Beijing (CN); Wuyuan Liu, Beijing (CN)

(73) Assignee: Yuemeng Liu, Beijing (CN)

( * ) Notice: Subject to any disclaimer, the term of this patent is extended or adjusted under 35 U.S.C. 154(b) by 30 days.

(21) Appl. No.: 15/511,072

(22) PCT Filed: Jul. 23, 2015

(86) PCT No.: PCT/CN2015/084924
§ 371 (c)(1),
(2) Date: Mar. 14, 2017

(87) PCT Pub. No.: WO2016/065957
PCT Pub. Date: May 6, 2016

(65) Prior Publication Data
US 2017/0274392 A1    Sep. 28, 2017

(30) Foreign Application Priority Data

Oct. 27, 2014 (CN) .................... 2014 2 0626461 U

(51) Int. Cl.
```
B01D 53/22    (2006.01)
B04B 7/16     (2006.01)
B01D 46/24    (2006.01)
B01D 46/54    (2006.01)
B01D 63/16    (2006.01)
B01D 71/26    (2006.01)
B01D 71/36    (2006.01)
B01L 3/00     (2006.01)
B01D 61/18    (2006.01)
```

(52) U.S. Cl.
CPC ............ *B04B 7/16* (2013.01); *B01D 46/2403* (2013.01); *B01D 46/543* (2013.01); *B01D 61/18* (2013.01); *B01D 63/16* (2013.01); *B01D 71/26* (2013.01); *B01D 71/36* (2013.01); *B01L 3/5021* (2013.01); *B01D 2325/38* (2013.01)

(58) Field of Classification Search
CPC .. B01D 61/18; B01D 46/543; B01D 2325/38; B01D 46/2403; B01D 71/26; B01D 71/36; B01D 63/16; B01L 3/5021; B04B 7/16
See application file for complete search history.

(56) References Cited

U.S. PATENT DOCUMENTS

| | | | | | |
|---|---|---|---|---|---|
| 3,717,525 A | * | 2/1973 | Bueltemann | ............ | G01M 3/20 156/155 |
| 4,592,848 A | * | 6/1986 | Pabst | ..................... | B01D 61/18 210/108 |
| 4,767,426 A | * | 8/1988 | Daly | .................. | B01D 39/2024 156/86 |
| 4,889,626 A | * | 12/1989 | Browne | ................. | B01D 61/22 210/359 |

(Continued)

*Primary Examiner* — Anthony R Shumate
(74) *Attorney, Agent, or Firm* — SV Patent Service

(57) ABSTRACT

The present invention discloses a centrifuge filtration tube comprising a centrifuge tube (2) and a centrifuge tube (1) housed in the centrifuge tube (2). One or more constant-volume vents (7) and multiple pores (4) are provided on a sidewall of the centrifuge tube (1). The one or more constant-volume vents (7) are located above the pores (4). The pores (4) are covered with a filtering membrane (3). The disclosed centrifuge filtration tube has the advantages of being simple, easy to use, highly efficient, and inexpensive, which can save large amounts of labor and time in analyses of large number of samples.

8 Claims, 2 Drawing Sheets

(56) References Cited

U.S. PATENT DOCUMENTS

| | | | | |
|---|---|---|---|---|
| 4,906,370 A | * | 3/1990 | Galaj | B01D 63/16 210/321.67 |
| 5,275,725 A | * | 1/1994 | Ishii | B01D 63/084 210/321.67 |
| 5,374,663 A | * | 12/1994 | Daicho | A61F 2/1613 351/159.63 |
| 5,557,945 A | * | 9/1996 | Mangyo | F25B 43/003 210/DIG. 6 |
| 5,827,429 A | * | 10/1998 | Ruschke | A61M 5/165 210/321.75 |
| 6,013,421 A | * | 1/2000 | Nakamura | G03C 8/408 430/203 |
| 6,269,957 B1 | * | 8/2001 | Bowers | B01D 61/18 210/321.6 |
| 6,692,702 B1 | * | 2/2004 | Burshteyn | B01D 61/147 210/416.1 |
| 8,956,880 B2 | * | 2/2015 | Keenan | B01D 63/02 435/287.2 |
| 2003/0047505 A1 | * | 3/2003 | Grimes | B01D 63/16 210/483 |
| 2006/0060531 A1 | * | 3/2006 | Coville | B01D 61/147 210/650 |
| 2008/0139782 A1 | * | 6/2008 | Saitoh | C08G 75/0204 528/381 |
| 2010/0249342 A1 | * | 9/2010 | Unohara | C08G 75/0213 525/535 |
| 2012/0237960 A1 | * | 9/2012 | Endermann | B01L 3/5021 435/13 |
| 2017/0210760 A1 | * | 7/2017 | Li | A61K 31/5383 |

* cited by examiner

CENTRIFUGE FILTER TUBE

TECHNICAL FIELD

The present invention relates to the field of chemical analysis, and in particular, to a centrifuge filtration tube.

BACKGROUND OF THE INVENTION

For the purpose of various research, it is often necessary to liquefy samples such as soil, meat, water, flora, and fauna, etc., and to separate and remove small solid particles from the treatment liquids before they can be used for testing in large-scale high-precision instruments (such as flow analysis injectors, liquid chromatography mass spectrometry, etc.). Otherwise, these particles will block or wear off the instruments' sample input channels, which can cause instrument failures and shorten their life expectancy. Conventionally, solutions for this problem are filtering or pressurized filtering. But for high volume samples, these methods are inefficient, time-consuming, and laborious.

Patent application CN202290316U has described a double-layer pipe in which an inner tube is provided with a plurality of openings for blocking polymeric pellets which only allows liquid to flow out under gravity (at rest). The function of the disclosed device is equivalent to a screen, which can only conduct simple solid-liquid separation treatment. The disclosed device can neither produce controlled liquid flow, nor achieve separation of hydrophilic and hydrophobic liquids.

SUMMARY OF THE INVENTION

The main object of the present invention is to provide a centrifuge filtration tube which makes it more efficient, quick, and convenient for analyses of certain biological or chemical samples.

The present invention includes the following technical features:

A centrifuge filtration tube includes a second centrifuge tube (2) and a first centrifuge tube (1) housed in the centrifuge tube (2). The first centrifuge tube (1) includes one or more constant-volume vents (7) and multiple pores (4) on a side wall of the first centrifuge tube (1). The one or more constant-volume vents (7) are located above the pores (4). A filtering membrane (3) covers the pores (4).

Further, the one or more constant-volume vents (7) can be located in an upper portion of the side wall of the centrifuge tube (1). The pores (4) can be located in a middle portion of the side wall of the centrifuge tube (1).

Further, the one or more constant-volume vents (7) can be located in a top cover of the centrifuge tube (1). The pores (4) can be located in a middle portion of the side wall of the centrifuge tube (1).

Further, the filtering membrane can be positioned on an inner wall of the centrifuge tube (2) and covers the pores (4) in the side wall of the first centrifuge tube (1).

Further, the filtering membrane can be a microporous membrane.

Further, the filtering membrane can be a polypropylene microporous membrane.

Further, the filtering membrane can be a polytetrafluoroethylene air filtration membrane.

Further, the filtering membrane can be a hydrophobic filter.

The centrifuge filtration tube of the present invention includes a microporous membrane coated on the inner tube having pores. Since the microporous membrane has a large surface tension, a liquid inside the microporous membrane does not flow out when only gravity is present (still state); this state is equivalent to a closed valve. When the centrifuge filtration tube is put to high-speed rotation in a centrifuge, the centrifugal force overcomes the liquid surface tension, which allows the liquid to flow out of the microporous membrane; this state is equivalent to an open valve. The pores in the membrane function as a valve under the control of centrifuge forces, which can be closed or opened by centrifugal rotations; its role is completely different from the screen using in conventional technologies. In practice, the present invention only requires for a low-speed centrifugal rotation (2000-4000 rpm) for a short period (3-5 min), which is particularly suitable for scientific research workers handling a large number of samples, and can save a lot of manpower and time.

The present invention can be implemented by the following technologies: a plastic centrifuge filtration tube comprising a centrifuge tube 1 having one or a plurality of pores in the middle of its side wall. The pores in the side wall are sealed with a layer of membrane. The side wall of the centrifuge filtration tube 1 includes a constant-volume vent 7 for balancing the internal and external air pressures during centrifugation. The centrifuge tube 1 is placed in another 50 mL commercial centrifuge tube 2. When the test is started, a sample liquid suspension is placed in the centrifuge tube 2, and the centrifuge tube 1 with filtration pores on its side wall is placed in the centrifuge tube 2. The centrifuge is started. At this time, the portion of the liquid having the liquid level higher than the pores is moved into the centrifuge tube 1 by centrifuge forces, to achieve the goal of rapid clearing of the sample suspension.

Compared with conventional technologies, the present invention includes the following advantageous effects: it only requires for a low-speed centrifugal rotation (2000-4000 rpm) for a short period (3-5 min), which is particularly suitable for scientific research workers handling a large number of samples, and can save a lot of manpower and time.

wherein 1—small centrifuge tube, 2—large centrifuge tube, 3—filtering membrane; 4—pore, 5—a top cover of the small centrifuge tube 1, 6—a top cover of the large centrifuge tube, 7—constant-volume vent, 11—a side wall of the small centrifuge tube, 21—a side wall of the large centrifuge tube, and 31—a cross section of the filtering membrane.

DETAILED DESCRIPTION OF IMPLEMENTATIONS

Figure 1:
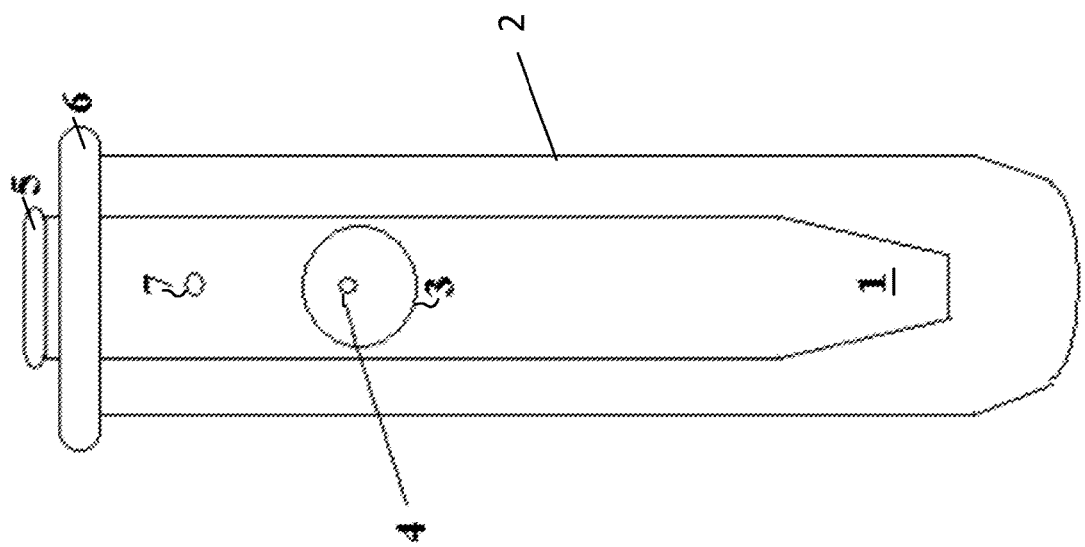
FIG. 1 is a schematic diagram of the disclosed centrifuge filtration tube.

The present invention is now described in further detail with reference to the accompanying drawings, FIG. 1 is a schematic diagram for a centrifuge filtration tube, including: a small centrifuge tube 1; a large centrifuge tube 2, a filtering membrane 3 attached to the side wall of the small centrifuge tube 1; one or more pores 4 on the small centrifuge tube 1, a top cover 5 of the small centrifuge tube 1, a top cover 6 of the large centrifuge tube 2, and a constant-volume vent 7 on the upper portion of the small centrifuge tube 1 (the constant-volume vent 7 may be provided on the top cover 5 of the small centrifuge tube 1). A large hole is opened in the top of the large centrifuge tube 2 through which the small centrifuge tube 1 is placed into the large centrifuge tube 2. The constant-volume vent 7 is opened in the upper portion of the small centrifuge tube 1 for exhausting air and maintaining constant volume.

Figure 2:
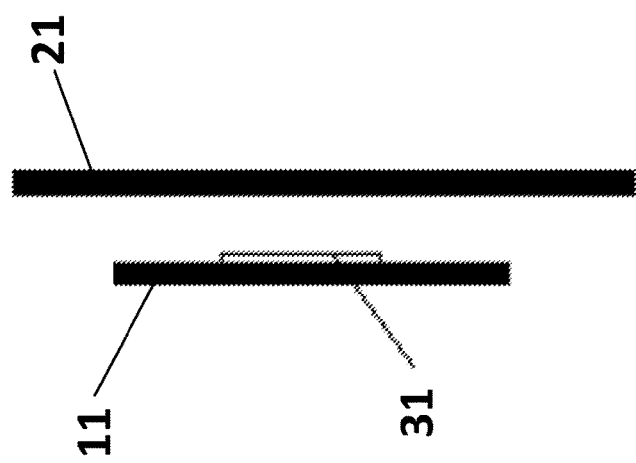
FIG. 2 is a partial cross-sectional view of the centrifuge filtration tube.

FIG. 2 is a cross-sectional view of the centrifuge filtration tube. The small centrifuge tube 1 includes a side wall 11. The large centrifuge tube 2 includes a side wall 21. The filtering membrane 3 has a cross section 31.

Example 1 place the liquid to be cleared in a commercially available centrifuge tube 2, place the centrifuge tube 1 therein, and start the centrifuge. Wait until the liquid flows into the centrifuge tube 1 through the pores in the side wall of the centrifuge tube 1. Depending on different pore sizes of the pores, the filtering membrane can block macromolecules or large particles away outside of the centrifuge tube 1. A relatively pure solution can thus be obtained in the centrifuge tube 1.

Example 2

The filtering members affixed to the sidewall of the centrifuge tube 1 can be formed by different types of films such as polypropylene microporous membrane, a polytetrafluoroethylene air filtration membrane, or a hydrophobic membrane, etc.

What is claimed is:

1. A centrifuge filtration tube (1), comprising:
   a first centrifuge tube (1) comprising a side wall that includes one or more constant-volume vents (7) and multiple pores (4), wherein the constant-volume vents (7) are located above the pores (4);
   a filtering membrane (3) that covers the pores (4); and
   a second centrifuge tube (2) in which the first centrifuge tube (1) is housed.

2. The centrifuge filtration tube of claim 1, wherein the one or more constant-volume vents (7) are located in an upper portion of the side wall of the centrifuge tube (1), wherein the pores (4) are located in a middle portion of the side wall of the centrifuge tube (1).

3. The centrifuge filtration tube of claim 1, wherein the centrifuge tube (1) include a top cover, wherein the one or more constant-volume vents (7) are located in the top cover of the centrifuge tube (1), wherein the pores (4) are located in a middle portion of the side wall of the centrifuge tube (1).

4. The centrifuge filtration tube of claim 1, wherein the filtering membrane is positioned on an inner wall of the centrifuge tube (2) and covers the pores (4) in the side wall of the first centrifuge tube (1).

5. The centrifuge filtration tube of claim 1, wherein the filtering membrane is a microporous membrane.

6. The centrifuge filtration tube of claim 5, wherein the filtering membrane is a polypropylene microporous membrane.

7. The centrifuge filtration tube of claim 5, wherein the filtering membrane is a polytetrafluoroethylene air filtration membrane.

8. The centrifuge filtration tube of claim 5, wherein the filtering membrane is a hydrophobic filter.

* * * * *